US008986768B2

(12) United States Patent
Tikanmäki et al.

(10) Patent No.: US 8,986,768 B2
(45) Date of Patent: *Mar. 24, 2015

(54) LOW-LACTOSE AND LACTOSE-FREE MILK PRODUCT AND PROCESS FOR PRODUCTION THEREOF

(75) Inventors: Reetta Tikanmäki, Espoo (FI); Harri Kallioinen, Haarojoki (FI)

(73) Assignee: Valio Ltd., Helsinki (FI)

( * ) Notice: Subject to any disclaimer, the term of this patent is extended or adjusted under 35 U.S.C. 154(b) by 808 days.

This patent is subject to a terminal disclaimer.

(21) Appl. No.: 12/201,301

(22) Filed: Aug. 29, 2008

(65) Prior Publication Data

US 2010/0055286 A1 Mar. 4, 2010

(51) Int. Cl.
| | |
|---|---|
| A23C 9/154 | (2006.01) |
| A23C 9/00 | (2006.01) |
| A23C 9/12 | (2006.01) |
| A23C 9/142 | (2006.01) |
| A23C 9/15 | (2006.01) |
| A23C 21/02 | (2006.01) |

(52) U.S. Cl.
CPC ............. *A23C 9/1206* (2013.01); *A23C 9/1422* (2013.01); *A23C 9/1425* (2013.01); *A23C 9/1512* (2013.01); *A23C 21/023* (2013.01); *A23C 2210/206* (2013.01)
USPC .......................................... 426/580; 426/491

(58) Field of Classification Search
CPC .. A23C 9/1206; A23C 9/1422; A23C 9/1512; A23C 21/023; A23C 9/1425; A23C 2210/206
USPC .................................... 426/580, 491
See application file for complete search history.

(56) References Cited

U.S. PATENT DOCUMENTS

| | | | |
|---|---|---|---|
| 2004/0040448 A1* | 3/2004 | Dunker et al. ................... | 99/452 |
| 2006/0057253 A1* | 3/2006 | Amador ........................... | 426/72 |
| 2007/0166447 A1* | 7/2007 | Ur-Rehman et al. ......... | 426/580 |
| 2010/0055289 A1* | 3/2010 | Kallioinen et al. ........... | 426/587 |

FOREIGN PATENT DOCUMENTS

| | | |
|---|---|---|
| EP | 0 250 623 | 1/1988 |
| EP | 250623 A1 * | 1/1988 |
| EP | 0 226 035 B1 | 7/1990 |
| JP | 07-213232 | 8/1995 |
| JP | 2002000291 A * | 1/2002 |
| KR | 2004103818 A * | 12/2004 |
| KR | 20040103818 | 12/2004 |
| WO | WO 00/45643 | 8/2000 |
| WO | WO 00/45643 | 10/2000 |
| WO | WO 01/11990 A1 | 2/2001 |
| WO | WO 01/60171 A1 | 8/2001 |
| WO | WO 03/094623 A1 | 11/2003 |
| WO | WO 2004/019693 A2 | 3/2004 |
| WO | WO 2005/074693 A1 | 8/2005 |
| WO | WO 2006/087409 A1 | 8/2006 |
| WO | WO 2007/076873 A1 | 7/2007 |
| WO | WO 2008/077071 A1 | 6/2008 |
| WO | WO 2009/043877 A1 | 4/2009 |
| WO | WO 2009/043882 A1 | 4/2009 |

OTHER PUBLICATIONS

Chiu, CP and Kosikowski, FV Hydrolyzed Lactose Syrup from Concentrated Sweet Whey PermeatesJ. Dairy Sci. (1985) 68(1):16-22. (abstract).*
SH Choi, SB Lee, HR Won Development of Lactose-hydrolyzed Milk with Low Sweetness with Nanofiltration. Asian-Aust. J. Animal Science 20(6):989-993, Jun. 2007.*
Senad Novalin, Winfried Neuhaus, Klaus D. Kulbe A new innovative process to produce lactose-reduced skim milk.Journal of Biotechnology 119 (2005) 212-218.*
Roger et al. Hydrolyzed lactose contained in the ultrafiltrate of milk or milk products in an enzymatic membrane reactor. Ann Nutr Aliment. 1978; 32(2-3):657-69 (Abstract).*
Thomet A., Rehberger B., Wyss B., Bisig W.Obtaining sugar syrup from milk serum Agrarforschung 11(8), 348-353, 2004 (Abstract).*
Choi et al, "Development of Lactose-hydrolyzed Milk with Low Sweetness Using Nanofiltration", Asian-Aust. J. Anim. Sci, vol. 20, No. 6: 989-993, Jun. 2007.
Arndt, EA et al, "Development of Hydrolyzed and Hydrolyzed-Isomerized Syrups . . . ", Journal of Food Science, 1989, vol. 54, No. 4, s. 880-4.
Arndt EA et al, "Evaluation of Sweetener Syrups Derived from Whey . . . ", Cereal Foods World, 1989, vol. 34, o. 5, s. 423-424, 426-428.
Morr, CV et al, "Lactose-Hydrolyzed Cottage Cheese Whey . . . ", Milchwissenschaft, 1998, vol. 53, No. 10, s. 568-572.
Shah, N et al, "Lactose Hydrolysis During Ultrafiltration . . . ", Milchwissenschaft, 1987, vol. 42, Nr. 12, s. 782-786.
English translation of Official Action in Russian application Serial No. 2011111561 issued Jun. 17, 2013.
Official Action in JP 2011-524420 w/English translation mailed Jul. 30, 2013.
Official Action in Chilean application Serial No. 2011-000410 issued Dec. 15, 2012, and notified to the local agent on Dec. 12, 2012.
Meieriposten, 1986, Abrahamsen, "Membrane Filtration, an aid to dairy technology", resumen, XP002576341.
Dissertation Abstracts Int., vol. 40, No. 3, 1979, Lonergan "Use of electrodialysis and ultrafiltration procedures to improve protein stability of frozen concentrated milk", resumen, XP002576342.
Nordeuropaeisk Mejeri-Tidsskrift, vol. 44, No. 5/6, 1978, Norman et al, "Enzymic treatment of whey with recovery of the enzyme by ultrafiltration", resumen, XP002576343.
Hayasawa et al, "Manufacture of milk protein hydrolyzed substance with low lactose content, involves treating milk protein with lactose degradation enzyme and/or protease and removing lactose decomposed product by nanofiltration", resumen, XP002576345, JP2002000291A Jan. 8, 2002.

* cited by examiner

Primary Examiner — Humera Sheikh
Assistant Examiner — Subbalakshmi Prakash
(74) Attorney, Agent, or Firm — Nixon & Vanderhye P.C.

(57) ABSTRACT

The invention relates to a low-lactose and a lactose-free milk product and to a process for the production thereof. The lactose in the milk raw material is hydrolyzed, proteins, minerals and sugars are separated into different fractions by the membrane technique, and a low-lactose or a lactose-free milk product is composed from the fractions. The invention provides a milk product, the water therein originating from the original milk raw material. In addition, useful by-products are produced in the process.

7 Claims, No Drawings

LOW-LACTOSE AND LACTOSE-FREE MILK PRODUCT AND PROCESS FOR PRODUCTION THEREOF

FIELD OF THE INVENTION

The invention relates to a low-lactose and a lactose-free milk product and to a process for the production thereof. The lactose in the milk raw material is hydrolyzed completely or partially, and proteins, minerals and sugars are separated into different fractions. The invention relates particularly to the use of the membrane filtration technique in the separation of proteins, minerals and sugars.

BACKGROUND OF THE INVENTION

Several processes for producing low-lactose and lactose-free milk by using membrane techniques are known. A conventional enzymatic process for splitting lactose is also generally known in the field, the process comprising the step of adding lactase from fungus or yeast to milk in such a manner that lactose is split into monosaccharides, i.e. glucose and galactose, in over 80%.

Several membrane filtration process solutions have been presented for removing lactose from milk raw material. Four basic membrane filtration processes are generally used: reverse osmosis (RO), nanofiltration (NF), ultrafiltration (UF), and microfiltration (MF). Of these, UF is mainly suitable for separating lactose from milk. Reverse osmosis is generally applied to concentration, ultra- and microfiltration to fractionation, and nanofiltration to both concentration and fractionation. A lactose removal process based on a membrane technique is described in WO publication 00/45643, for instance, wherein lactose is removed by ultrafiltration and diafiltration. When filtration processes are used, the problem often created is the generation of side fractions, such as a permeate or lactose fractions. Published US application 2007/0166447 discloses the use of a lactose-containing NF retentate fraction generated as a side fraction as the raw material of fermentation in the production of yoghurt, for example.

Recent studies have indeed been concentrated on the membrane filtration of milk and to the use of such filtrated, low-carbohydrate milk in the production of dairy products, such as cheese, ice cream and yoghurt. It is common to the known, multi-step membrane filtration processes comprising several different processes that the processes include the separate addition of water, which does not originate from the milk raw material, for diluting milk components and for obtaining a suitable sweetness in milk products containing little carbohydrate (i.a. lactose). It is particularly problematic in the field that a product containing liquid that does not completely originate from the original milk raw material cannot be called milk. It is also common to known processes that the residual lactose is not removed until from the membrane-filtrated milk raw material.

It is known in the field that a problem with membrane techniques in general is that during ultrafiltration not only lactose is removed from the milk, but also some of the minerals that are significant to the taste of milk and milk products prepared thereof. Controlling the mineral content is particularly problematic in the field, and extensive loss results from the known processes, which is why these minerals must often be returned or added separately.

Often membrane processes also produce, for instance, sugar-containing and mineral-containing secondary flows, which cannot be exploited efficiently and which also increase waste water load, require further processing and add to the costs.

WO publication 2005/074693 discloses the use of the membrane technology in the production of lactose-free milk. It is typical of the process that the ultrafiltration retentate is diluted with water, resulting in a lactose content of about 3.0%. The residual lactose is hydrolyzed enzymatically.

WO publication 03/094623 A1 discloses a process in which a milk product is ultrafiltered, nanofiltered, and concentrated by reverse osmosis, after which the minerals removed during ultrafiltration are returned to the UF retentate. The residual lactose of the thus obtained low-lactose milk product is hydrolyzed with a lactase enzyme into monosaccharides, whereby an essentially lactose-free milk product is obtained. With this process, lactose is removed from milk without affecting the organoleptic properties of the milk product being prepared. In the process for producing a milk product, water not originating from any steps of said process is added. Also, the process produces minerals containing secondary flows, which cannot be utilized in the process and which require post-processing.

Patent publication KR20040103818 describes a process for the production of low-lactose milk, comprising nanofiltering milk hydrolyzed with lactase to partially remove galactose and glucose, and adding water to the nanofiltration retentate to achieve a suitable sweetness. Choi et al. (Asian-Aust. J. Anim. Sci 20 (6) (2007) 989-993) describe a process for the production of lactose-hydrolyzed milk, wherein raw milk is hydrolyzed with β-galactosidase (5 000 lactase activity unit/g, Validase, Valley Research) partially (0.03%; 4° C., 24 hours) or 'completely' (0.1%; 40 h), heat-treated to inactivate the enzyme (72° C., 5 min), cooled to 45 to 50° C., and nanofiltered at a pressure of approximately 9 to 10 bars (130 to 140 psi; concentration factor 1.6). Water was added to the NF retentate and the heat treatment was performed at 65° C. for 30 min. The processes disclosed in said publications and comprising a hydrolysis step, heat treatment of the enzyme, nanofiltration, and addition of water, are not suitable as such for the production of a milk product without separate addition of water. The process also comprises separate heat treatment for inactivating the enzyme and for eliminating microbiological problems in the filtration step (i.e. in NF filtration in a warm environment). The high hygiene requirements of milk processing also set limitations on industrial processes. In the industrial processing of milk raw material and membrane processes, a temperature of e.g. 10° C. is generally desirable for eliminating microbiological problems.

It is therefore desirable to provide processes for controlling also the secondary flows in the process and for recovering them more efficiently than at present, which also enables new kinds of applications. Thus, the processes are made still more effective. However, it is extremely challenging to achieve products having a completely flawless taste and structure and meeting consumers' expectations of an organoleptically acceptable milk product and being produced economically and simply without separate addition of water.

A process for the production of low-lactose and lactose-free milk products that are completely flawless in their organoleptic properties without any extra costs has now been unexpectedly invented. The process of the invention enables a more efficient and simpler control of milk components as compared with conventional processes without special additional costs and with minimized losses. No separate addition of water is required in the production of a milk product. In addition, the process of the invention does not generate secondary flows requiring post-processing, making the process more efficient.

BRIEF DESCRIPTION OF THE INVENTION

The present invention provides a new solution for avoiding the problematic need arising in the production of both low-lactose, lactose-free, and low-carbohydrate, and in the production of protein-enriched milk products and products having a modified protein composition for the separate addition of water and the problems associated with the organoleptic characteristics, particularly taste, of such milk products by a process, wherein the lactose in the milk raw material is hydrolyzed, proteins, sugars and minerals being separated from the obtained hydrolyzed milk raw material into different fractions by the membrane technique. The desired milk product can be prepared from the separated fractions without any separate addition of water.

The invention provides a process for the production of low-lactose and lactose-free milk products, the process being characterized by what is stated in the independent claim. The invention also provides a low-lactose and lactose-free milk product produced from the different fractions obtained by the process of the invention. The process of the invention enables the production of low-lactose and lactose-free milk products in a simplified and enhanced manner, resulting in no need for separate supplementation/addition of water, salts and/or protein, the by-products being particularly suitable for use in various applications in the same production plant.

All by-products obtained as a result of the process according to the invention are common dairy products and the secondary flows produced in the process can be further exploited in the process of the invention. The process does not lead to products or secondary flows, which should be processed or separated in an exceptional way, which means that the waste water load is minimized.

In addition, protein and mineral losses typical of lactose-free and low-lactose milk products in particular are avoided, and especially the recovery of dilute aqueous solutions generated in the process is enhanced.

The invention further provides a process that is simple, economic, and industrially applicable on a large scale, and does not cause additional costs.

It was unexpectedly found that complete or partial hydrolysis of lactose in a milk raw material and by means of the membrane filtration technique resulted in efficient control of the process waters, and the ratio of minerals and protein. Accordingly, the invention provides a process for treating the components of the milk raw material of hydrolyzed skim milk in a manner enabling the efficient utilization of flows generated in the process, i.a. dilute aqueous solutions, without any need for the separate addition of water in the process.

The milk product produced by the process of the invention has the desired organoleptic characteristics, contains a minor number of carbohydrates, and contains nutritional components at least in an amount comparable to normal milk.

The invention also provides the use of some fractions obtained by the process of the invention as a sweetener and in fermentation processes, and as diawater in diafiltration.

DETAILED DESCRIPTION OF THE INVENTION

As an aspect, the invention relates to a process for producing a low-lactose or a lactose-free milk product, the process comprising a) hydrolyzing the lactose in a milk raw material, thus obtaining a hydrolyzed milk raw material, b) membrane filtration of the hydrolyzed milk raw material to separate proteins, sugars and minerals into different fractions, c) further processing, if desired, one or more of the obtained fractions by the membrane technique and/or by evaporation and/or chromatographically, d) composing a product with a desired composition and sweetness from one or more fractions obtained in step b) and, if desired, from one or more fractions obtained in step c) and possibly from other ingredients, e) if desired, concentrating the product obtained in step d) to a concentrate or a powder.

In the context of the present invention, a milk raw material refers to milk, whey, and combinations of milk and whey as such or as a concentrate. The milk raw material may be supplemented with ingredients generally used in the preparation of milk products, such as fat, protein or sugar fractions, or the like. The milk raw material may thus be, for instance, full-fat milk, cream, low-fat milk or skim milk, ultrafiltered milk, diafiltered milk, microfiltered milk or milk recombined from milk powder, organic milk or a combination of these. Preferably, the milk raw material is skim milk.

In step a) of the process of the invention, lactose in the milk raw material is hydrolyzed into monosaccharides, as is well known in the field. In an embodiment of the process of the invention, the hydrolysis is carried out completely (complete hydrolysis) prior to the membrane filtration step, wherein the milk components are separated. In another embodiment of the process of the invention, the hydrolysis is carried out partially prior to the filtration step and partially the residual lactose in the hydrolyzed milk raw material is then post-hydrolyzed and substantially simultaneously with the filtration of the partially hydrolyzed milk raw material, i.e. separation of the milk components. The membrane filtration of step a) may comprise a plurality of membrane filtration steps. In an embodiment of the process of the invention, the hydrolysis is carried out substantially during the first membrane filtration. According to an embodiment of the invention, the first membrane filtration is ultrafiltration (UF).

Complete hydrolysis means that the hydrolyzed milk raw material is lactose-free, the lactose content being not more than 0.5%. Partial hydrolysis means that the lactose content in the hydrolyzed milk raw material is >0.5%.

In step b) of the process of the invention, the partially or completely hydrolyzed milk raw material obtained in the previous step a) is membrane-filtered for separating proteins, sugars and minerals into different fractions by changing the membrane filtration technique, process conditions and/or different types of membranes. The condition to be changed may be e.g. filtration temperature, filtration pressure, addition of diawater, and/or the concentration factor of the filtration. The conditions of one or more variables may be changed. In an embodiment of the process of the invention, the membrane filtration is carried out by ultrafiltration.

In accordance with step c) of the process of the invention, the one or more retentate or permeate fractions obtained in the previous step b) may be further processed by membrane techniques and/or by evaporation and/or chromatographically to further enhance the separation of proteins, sugars and minerals. It is essential to the invention that the further processing may be carried out without the addition of water. Out of membrane techniques suitable for further processing, for instance nanofiltration (NF) and reverse osmosis (RO), particularly nanofiltration, may be mentioned. The further processing may comprise several membrane filtration steps. Different separation processes may also be combined in the desired manner in one or more steps.

In an embodiment of the invention, the NF permeate obtained in the nanofiltration of the hydrolyzed milk raw material is utilized as diawater in diafiltration (DF) in the process of the invention. However, the use of the NF permeate obtained in accordance with the invention is not restricted only to the process of the invention, but it may be utilized also in other membrane filtration processes. In a particular embodiment of the invention, the NF permeate originates from the nanofiltration of the UF permeate of the hydrolyzed milk raw material.

The protein, sugars and minerals in the hydrolyzed milk raw material are separated by membrane techniques, preferably by ultrafiltration in the first step under conditions wherein the retention of sugars in the retentate is low.

Suitable ultrafiltration membranes include HFK-131 (Koch membrane systems, Inc., USA), for example. Suitable nanofiltration membranes include Desal 5 DL (GE Osmonics, USA), Desal 5 DK (GE Osmonics, USA), TFC® SR3 (Koch membrane systems, Inc., USA), FILMTEC™ NF (Dow, USA), for example. Suitable reverse osmosis membranes include TFC® HR (Koch membrane systems, Inc., USA) and FILMTEC FT30 (Dow, USA), for example.

The concentration factor (K) refers to the weight ratio between the liquid to be fed into the filtration and the retentate, and it is determined in the following manner:

$$K=\text{feed (kg)/retentate (kg)}$$

In the process of the invention, ultrafiltration is preferably carried out with concentration factor K=1 to 10, more preferably 2 to 6, and nanofiltration is preferably carried out with concentration factor K=1 to 10, more preferably K=2 to 6. If diafiltration is used, the concentration factor may be considerably bigger.

In accordance with step d) of the process of the invention, a lactose-free or low-lactose milk product having the desired composition and sweetness is composed from the one or more fractions obtained from the membrane filtration of the hydrolyzed milk raw material and, if desired, also from the one or more fractions obtained from the further processing. Said fractions may also be composed into low-carbohydrate and protein-enriched milk products and milk products having modified protein compositions. Other ingredients may also be added to the product. In an embodiment of the invention, the milk product is composed substantially without adding water, in which case a fraction or fractions of the hydrolyzed milk raw material obtained from the process of the invention are used as the liquid required in composing the product. As such liquid to be added, particularly the RO permeate, the NF permeate or condensation water generated in the concentration or evaporation of the hydrolyzed milk raw material may be mentioned. In an embodiment of the invention, the NF permeate originates from the nanofiltration of the UF permeate of the hydrolyzed milk raw material.

As the liquid, also tap water may be partially used. In the context of the present invention, the term 'substantially without adding water' means that at least 50% of the tap water is replaced with a fraction obtained with the process of the invention.

If desired, the low-lactose or lactose-free milk product produced with the process of the invention may be concentrated into a milk concentrate or into milk powder.

The milk product according to the present invention is low-lactose or lactose-free. In the present invention, the term low-lactose means that the lactose content of the milk product is not more than 1%. The term lactose-free means that the lactose content of the milk product is 0.5 g/serving (e.g. for liquid milks 0.5 g/244 g, the lactose content being at most 0.21%), however not more than 0.5%. In accordance with the invention, milk drinks containing little carbohydrate and having flawless organoleptic characteristics may also be produced. Furthermore, the loss of the protein contained in the milk raw material is minimized and no separate supplementation/addition of minerals and/or protein is required.

The process of the invention is simple and suitable for large-scale production.

The process of the present invention may be applied to both batch and continuous production. Preferably, the process of the invention is implemented as a batch process.

In a second aspect, the invention provides a lactose-free and low-lactose milk product containing one or more fractions of a hydrolyzed milk raw material obtained from one or more membrane filtrations of the hydrolyzed milk raw material. In an embodiment of the invention, the lactose-free or low-lactose milk product comprises at least one of the fractions UF retentate, UF permeate, NF retentate, NF permeate, DF retentate, DF permeate, RO retentate and RO permeate. In a particular embodiment of the invention, the milk product of the invention is obtained protein-enriched in the form of a DF retentate.

As an aspect, the invention also relates to a lactose-free or low-lactose milk product produced with a process comprising the steps of:

a) hydrolyzing the lactose in a milk raw material, thus obtaining hydrolyzed milk raw material, b) membrane filtration of the hydrolyzed milk raw material to separate proteins, sugars and minerals into different fractions, c) further processing, if desired, one or more of the obtained fractions by the membrane technique and/or by evaporation and/or chromatographically, d) composing a product with a desired composition and sweetness from the one or more fractions obtained in step b) and, if desired, from the one or more fractions obtained in step c) and possibly from other ingredients, e) if desired, concentrating the product obtained in step d) into a concentrate or a powder.

The invention further relates to the use of an NF permeate obtained in the nanofiltration of a hydrolyzed milk raw material as diawater in membrane filtration processes. Said NF permeate can be used particularly in the diafiltration or the diafiltrations of the process of the invention. In an embodiment of the invention, the NF permeate originates from the nanofiltration of the UF permeate of the hydrolyzed milk raw material.

The invention also relates to the use of a sugar fraction containing glucose and galactose and obtained in the membrane filtration of the hydrolyzed milk raw material as a sweetener or in fermentation processes in the production of sour milk products, for example. In an embodiment of the invention, the sugar fraction is the UF permeate obtained in the ultrafiltration of the hydrolyzed milk raw material or the NF retentate obtained in the nanofiltration. In an embodiment of the invention, said NF retentate is the NF retentate obtained in the ultrafiltration of the hydrolyzed milk raw material. Compared with lactose-containing fractions, said glucose and galactose containing fractions obtained as a result of the hydrolysis are in a more easily and directly usable form for starters in the production of sour milk products, for example. Accordingly, the glucose and galactose containing fractions obtained by the process of the invention can be used as a fermentative sugar or fermentative sugars in fermentation processes.

The following examples illustrate the invention, but do not restrict the invention only to the embodiments illustrated.

Example 1

Ultrafiltration of Hydrolyzed Skim Milk in Cold Conditions (K=1.9)

Skim milk (40 l) was hydrolyzed (6° C., 18 h) with Godo YNL2 lactase (Godo Shusei Company, Japan), the dosage being 0.15%. The hydrolyzed skim milk was ultrafiltered with an HFK-131 membrane (Koch Membrane Systems Inc., USA) at a temperature of 9 to 19° C. and a pressure of 4.5 to 5.0 bar. The permeate flow was 3.8 to 6.5 l/m²h. Ultrafiltration was continued to a concentration factor of 1.9, i.e. when the volume of the UF retentate was 21 l and that of the UF permeate 19 l.

Samples were taken from the feed (hydrolyzed skim milk), the UF retentate and the UF permeate, and protein, dry matter, glucose, galactose and ash were determined therefrom (Table 1).

The UF retentate was used in composing a milk drink (Example 8; Tables 9 and 10).

TABLE 1

Compositions of feed, retentate and permeate of ultrafiltration of hydrolyzed skim milk.

| Composition | Feed (Hydrolyzed skim milk) | UF retentate | UF permeate |
| --- | --- | --- | --- |
| Protein (%) | 3.61 | 6.34 | — |
| Ash (%) | 0.78 | 0.99 | 0.45 |
| Glucose (%) | 2.49 | 2.50 | 2.62 |
| Galactose (%) | 2.24 | 2.34 | 2.40 |
| Dry matter (%) | 9.07 | 11.8 | 5.59 |

Example 2

Ultrafiltration of Hydrolyzed Skim Milk in Warm Conditions (K=4)

Skim milk (40 l) was hydrolyzed (6° C., 22 h) with Godo YNL2 lactase (Godo Shusei Company, Japan), the dosage being 0.15%. The hydrolyzed skim milk was ultrafiltered with an HFK-131 membrane (Koch Membrane Systems Inc., USA) at a temperature of 45 to 50° C. and a pressure of 1 to 3.5 bar. The permeate flow was 7.8 to 10.3 l/m²h. Ultrafiltration was continued to a concentration factor of 4, i.e. when the volume of the UF retentate was 10 l and that of the UF permeate 30 l.

Samples were taken from the feed (hydrolyzed skim milk), the UF retentate and the UF permeate, and protein, dry matter, glucose, galactose and ash were determined therefrom (Table 2).

The UF retentate was used in composing a milk drink (Example 8; Table 11), in composing a flavored milk drink (Example 9; Table 12), and in composing a whey protein containing milk drink (Example 10; Table 14).

The UF permeate was further processed by nanofiltration (Example 3).

TABLE 2

Compositions of feed, retentate and permeate of ultrafiltration of hydrolyzed skim milk.

| Composition | Feed (Hydrolyzed skim milk) | UF retentate | UF permeate |
| --- | --- | --- | --- |
| Protein (%) | 3.64 | 12.5 | — |
| Ash (%) | 0.78 | 1.50 | 0.44 |
| Glucose (%) | 2.50 | 2.17 | 2.63 |
| Galactose (%) | 2.20 | 2.08 | 2.46 |
| Dry matter (%) | 9.05 | 18.4 | 5.88 |

Example 3

Nanofiltration of Ultrafiltration Permeate of Hydrolyzed Skim Milk (K=2)

The experiment of Example 2 was continued by nanofiltration the ultrafiltration permeate to a concentration factor of 2 with a Filmtec NF membrane (Dow, USA) at a filtration temperature of 10 to 16° C. The permeate flow was 10 l/m²h and the pressure 11 to 17 bar. The feed was 29.5 liters, the NF retentate 14.5 liters, and the NF permeate 15 liters.

Dry matter, glucose, galactose and ash were determined from the feed, the NF retentate, and the NF permeate. The results are shown in Table 3.

The NF permeate was used in Example 5 in the diafiltration step.

The NF permeate was also used in composing milk drinks (Example 8; Tables 9 and 11).

TABLE 3

Nanofiltration of UF-permeate of hydrolyzed skim milk.
Composition of feed, retentate and permeate.

| Composition | Feed (Hydrolyzed UF permeate) (Example 2) | NF retentate | NF permeate |
| --- | --- | --- | --- |
| Ash (%) | 0.47 | 0.70 | 0.20 |
| Glucose (%) | 2.55 | 4.87 | 0.21 |
| Galactose (%) | 2.36 | 4.29 | 0.15 |
| Dry matter (%) | 5.7 | 10.3 | 0.62 |

Example 4

Two-Step Nanofiltration of Ultrafiltration Permeate of Hydrolyzed Milk (K=4, K=4)

The ultrafiltration permeate of hydrolyzed milk was nanofiltered with a Desal 5 DL membrane to a concentration factor of 4. The filtration temperature was 44 to 47° C., the permeate flow 10 l/m²h and the pressure 3 to 6 bar. The feed was 40 liters, NF retentate I 10 liters, and NF permeate I 30 liters.

Dry matter, glucose, galactose and ash were determined from the feed, NF retentate I, and NF permeate I. The results are shown in Table 4.

TABLE 4

Nanofiltration of ultrafiltration permeate of hydrolyzed milk.
Composition of feed, retentate and permeate.

| Composition | Feed (Hydrolyzed UF permeate) | NF retentate I | NF permeate I |
|---|---|---|---|
| Ash (%) | 0.46 | 0.87 | 0.31 |
| Glucose (%) | 2.51 | 3.21 | 2.32 |
| Galactose (%) | 2.33 | 3.05 | 2.19 |
| Dry matter (%) | 5.67 | 8.03 | 4.83 |

The permeate (NF permeate I) of the first nanofiltration was nanofiltered in a second step with a Filmtec NF membrane to a concentration factor of 4. The filtration temperature was 10 to 24° C., the permeate flow 11 to 3.2 l/m²h and the pressure 11 to 24 bar. The feed was 28.5 liters, NF retentate II 6 liters, and NF permeate II 22.5 liters.

Dry matter, glucose, galactose and ash were determined from the feed, NF retentate II, and NF permeate II. The results are shown in Table 5.

TABLE 5

Nanofiltration of NF-permeate I of UF-permeate of hydrolyzed milk. Composition of feed, retentate and permeate.

| Composition | Feed (NF permeate I) | NF retentate II | NF permeate II |
|---|---|---|---|
| Ash (%) | 0.29 | 0.51 | 0.19 |
| Glucose (%) | 2.28 | 7.56 | 0.20 |
| Galactose (%) | 2.11 | 6.75 | 0.18 |
| Dry matter (%) | 4.56 | 15.5 | 0.52 |

The two-step nanofiltration resulted in a purer sugar concentrate as NF retentate II, which has a lower ash content. Particularly from bivalent minerals, calcium and magnesium, 80% remained in NF retentate I.

NF retentate II was used as a sweetener in a flavored milk drink (Example 9; Tables 12 and 13).

NF permeate II was further concentrated by reverse osmosis and the RO permeate obtained was used in composing a cocoa milk drink (Example 9; Table 13).

Example 5

Ultrafiltration (K=2.2) of Hydrolyzed Skim Milk Combined with Diafiltration

Skim milk (40 l) was hydrolyzed (6° C., 18 h) with Godo YNL2 lactase (Godo Shusei Company, Japan), the dosage being 0.15%. The hydrolyzed skim milk was ultrafiltered with an HFK-131 membrane (Koch Membrane Systems Inc., USA) at a temperature of 8 to 13° C. and a pressure of 3.5 to 4.0 bar. The permeate flow was 5.3 to 7.5 l/m²h. The skim milk was concentrated to a factor of 2.2, i.e. when the volume of the UF retentate was 18 l and that of the UF permeate 22 l. Then, 14 liters of the NF permeate of Example 3 were gradually added to the UF retentate. After the diafiltration step, the volume of the DF retentate was 24 liters and the combined volume of the permeates obtained from the diafiltration and the ultrafiltration was 30 liters. Later on in the example, the combined UF and DF permeates will be called permeate.

Samples were taken from the feed (hydrolyzed skim milk), the DF retentate and the permeate, and protein, dry matter, glucose, galactose and ash were determined therefrom (Table 6).

TABLE 6

Compositions of feed, retentate and permeate of ultrafiltration and diafiltration of hydrolyzed skim milk.

| Composition | Feed (Hydrolyzed skim milk) | DF retentate | Permeate |
|---|---|---|---|
| Protein (%) | 3.58 | 5.51 | — |
| Ash (%) | 0.77 | 0.79 | 0.46 |
| Glucose (%) | 2.45 | 1.38 | 2.36 |
| Galactose (%) | 2.38 | 1.37 | 2.35 |
| Dry matter (%) | 8.95 | 8.76 | 5.27 |

A protein-enriched lactose-free milk drink is obtained as a DF retentate by circulating the nanofiltration permeate of the ultrafiltration permeate from Example 3 back to the ultrafiltration retentate. The DF retentate was also organoleptically evaluated and it was found to have a good and full taste.

Example 6

Ultrafiltration of Partially Hydrolyzed Skim Milk and Hydrolysis During Filtration (K=2.2)

Skim milk (40 l) was hydrolyzed (50° C., 1 h) with Lactoles L3 lactase (Biocon Ltd., Japan), the dosage being 0.18%. The partially hydrolyzed skim milk was ultrafiltered with an HFK-131 membrane (Koch Membrane Systems Inc., USA), the temperature being 43 to 45° C. and the pressure 1.0 to 3.5 bar. The permeate flow was 10 l/m²h. The skim milk was concentrated to a factor of 2.2, i.e. when the volume of the UF retentate was 18 l and that of the UF permeate 22 l. The UF permeate was then circulated back to the UF retentate. The progress of the hydrolysis was observed during the concentration and the circulating. The filtration was continued for two hours. At the beginning of the filtration, the lactose content of the milk was 0.24% and at the end of the filtration not more than 0.01%.

Samples were taken from the feed (hydrolyzed skim milk), the UF retentate after the filtration and the UF permeate, and protein, dry matter, glucose, galactose and ash were determined therefrom (Table 7).

TABLE 7

Compositions of feed, retentate and permeate of ultrafiltration of hydrolyzed skim milk.

| Composition | Feed (Hydrolyzed skim milk) | UF retentate | UF permeate |
|---|---|---|---|
| Protein (%) | 3.53 | 7.11 | — |
| Ash (%) | 0.77 | 1.08 | 0.48 |
| Glucose (%) | 2.32 | 2.58 | 2.59 |
| Galactose (%) | 2.13 | 2.50 | 2.47 |
| Lactose (%) | 0.24 | <0.01 | — |
| Dry matter (%) | 8.95 | 12.5 | 5.72 |

The results show that the hydrolysis of lactose can be continued during filtration.

Example 7

Nanofiltration of Hydrolyzed Whey (K=7)

Skimmed, centrifuged whey (40 l) was hydrolyzed (9° C., 20 h) with Godo YNL2 lactase (Godo Shusei Company, Japan), the dosage being 0.1% and nanofiltered with a Desal 5 DL membrane (GE Osmonics, USA), the temperature being 46 to 51° C., and the pressure 3 to 6.5 bar. The permeate flow was 10.0 to 13.5 l/m²h. The nanofiltration was continued to a concentration factor of 7, i.e. when the volume of the NF retentate was 5.5 l and that of the NF permeate 34.5 l.

Samples were taken from the feed (hydrolyzed whey), the NF retentate and the NF permeate, and protein, dry matter, glucose, galactose and ash were determined therefrom (Table 8).

TABLE 8

Compositions of feed, retentate and permeate of nanofiltration of hydrolyzed whey.

| Composition | Feed (Hydrolyzed whey) | NF retentate | NF permeate |
|---|---|---|---|
| Protein (%) | 0.61 | 4.59 | — |
| Ash (%) | 0.34 | 1.52 | 0.28 |
| Glucose (%) | 2.05 | 2.69 | 1.97 |
| Galactose (%) | 1.90 | 2.68 | 1.84 |
| Dry matter (%) | 5.02 | 10.20 | 4.10 |

The composition of the NF permeate separated from the hydrolyzed whey corresponded quite well to NF permeate I (Example 4; Table 4) separated from the ultrafiltration permeate of milk in corresponding conditions. If desired, the nanofiltration of the whey may be continued in a second step in the same way as was described in Example 4.

The NF retentate was used in composing a whey protein containing milk drink (Example 10; Table 14).

Example 8

Composing a Milk Drink from the Ultrafiltration Retentate of Hydrolyzed Skim Milk and the Nanofiltration Permeate of the Ultrafiltration Permeate A lactose-free milk drink 1 was composed from the ultrafiltration retentate of the hydrolyzed skim milk of Example 1 and from the nanofiltration permeate of the ultrafiltration permeate of Example 3. In a lactose-free milk drink 2, the nanofiltration permeate of the ultrafiltration permeate was replaced with water. A lactose-free milk drink 3 was composed from the ultrafiltration retentate of hydrolyzed skim milk and from the nanofiltration permeate of the ultrafiltration permeate of Example 3 and from skim milk. In addition, the milk mineral powder according to EP publication EP 1061811 B1 was used in the compositions.

The compositions of the fractions and the proportions thereof in the admixtures, and the compositions of the lactose-free milk drinks are shown in Tables 9 to 11. The compositions of the lactose-free skim milk drinks correspond to normal milk except for the carbohydrates. All water required in the drinks and part of the need for added milk mineral powder could be replaced with the nanofiltration permeate of the ultrafiltration permeate.

TABLE 9

Composing a lactose-free skim milk drink 1 from ultrafiltration retentate and nanofiltration permeate of ultrafiltration permeate of hydrolyzed skim milk.

| | UF retentate (example 1) | NF permeate (example 3) | Milk mineral powder | Lactose-free skim milk drink |
|---|---|---|---|---|
| Proportion (%) Composition | 51.9 | 47.8 | 0.37 | |
| Protein (%) | 6.34 | — | 9.12 | 3.3 |
| Glucose (%) | 2.50 | 0.21 | 23 | 1.5 |
| Galactose (%) | 2.34 | 0.15 | 22 | 1.4 |
| Ash (%) | 0.99 | 0.20 | 41 | 0.8 |
| Dry matter (%) | 11.8 | 0.62 | 96 | 6.8 |

TABLE 10

Composing lactose-free skim milk drink 2 from ultrafiltration retentate of hydrolyzed skim milk and from water.

| | UF retentate (example 1) | Water | Milk mineral powder | Lactose-free skim milk drink |
|---|---|---|---|---|
| Proportion (%) Composition | 51.3 | 48.1 | 0.61 | |
| Protein (%) | 6.34 | 0 | 9.12 | 3.3 |
| Glucose (%) | 2.50 | 0 | 23 | 1.4 |
| Galactose (%) | 2.34 | 0 | 22 | 1.3 |
| Ash (%) | 0.99 | 0 | 41 | 0.8 |
| Dry matter (%) | 11.8 | 0 | 96 | 6.6 |

TABLE 11

Composing lactose-free skim milk drink 3 from ultrafiltration retentate and nanofiltration permeate of ultrafiltration permeate of hydrolyzed skim milk.

| | UF retentate (example 2) | NF permeate (example 3) | Milk mineral powder | Skim milk | Lactose-free skim milk drink |
|---|---|---|---|---|---|
| Proportion (%) Composition | 12.1 | 37.6 | 0.29 | 50.0 | |
| Protein (%) | 12.50 | — | 9.12 | 3.58 | 3.3 |
| Glucose (%) | 2.17 | 0.21 | 23 | 2.45 | 1.6 |
| Galactose (%) | 2.08 | 0.15 | 22 | 2.38 | 1.6 |
| Ash (%) | 1.50 | 0.20 | 41 | 0.77 | 0.8 |
| Dry matter (%) | 18.4 | 0.62 | 96 | 8.95 | 7.2 |

Example 9

Use of Nanofiltration Retentate of Ultrafiltration Permeate as Sweetener in Cocoa Milk Drink A lactose-free cocoa milk drink was composed from lactose-free milk (fat content 1%), nanofiltration retentate 11 of Example 4, the ultrafiltration retentate of the hydrolyzed skim milk of Example 2, saccharose, low-lactose cream and cocoa powder. A low-lactose cocoa milk drink was composed from the RO permeate of Example 4, nanofiltration retentate II of Example 4, low-lactose skim milk powder, saccharose, lactose-free cream and cocoa powder. The compositions of the fractions and the proportions thereof in the drinks, and the compositions of the cocoa milk drinks are presented in Tables 12 and 13.

The organoleptic characteristics of both cocoa milk drinks were good and full. In the lactose-free cocoa milk drink, 30% of the required saccharose could be replaced with nanofiltration retentate II of Example 4, and 25% in the low-lactose drink.

TABLE 12

Composing lactose-free cocoa milk drink.

| | Lactose-free milk 1.0% | NF retentate II (Example 4) | UF retentate (Example 2) | Saccharose | Lactose-free cream | Cocoa powder | Lactose-free cocoa milk drink |
|---|---|---|---|---|---|---|---|
| Proportion (%) Composition | 53.6 | 30.2 | 11.2 | 3.1 | 1.1 | 0.8 | |
| Protein (%) | 3.5 | — | 12.5 | — | 2.0 | — | 3.3 |
| Fat (%) | 1.0 | — | — | — | 38 | — | 0.9 |
| Glucose (%) | 2.3 | 7.56 | 2.17 | — | 1.4 | — | 3.5 |
| Galactose (%) | 2.3 | 6.75 | 2.08 | — | 1.4 | — | 3.8 |
| Lactose (%) | — | — | — | — | — | — | 0 |
| Saccharose (%) | — | — | — | 100 | — | — | 3.1 |
| Ash (%) | 0.7 | 0.51 | 1.5 | — | 0.5 | — | 0.7 |
| Dry matter (%) | 10 | 15.5 | 18.4 | 100 | 43 | 100 | 16.5 |

TABLE 13

Composing low-lactose cocoa milk drink.

| | RO permeate (Example 4) | NF retentate II (Example 4) | Low-lactose skim milk powder | Saccharose | Lactose-free cream | Cocoa powder | Low-lactose cocoa milk drink |
|---|---|---|---|---|---|---|---|
| Proportion (%) Composition | 65.6 | 19.4 | 8.4 | 3.5 | 2.3 | 0.80 | |
| Protein (%) | — | — | 35 | — | 2.0 | — | 3.0 |
| Fat (%) | — | — | 1.0 | — | 38 | — | 0.9 |
| Glucose (%) | <0.1 | 7.56 | 21 | — | 1.4 | — | 3.3 |
| Galactose (%) | <0.1 | 6.75 | 21 | — | 1.4 | — | 3.2 |
| Lactose (%) | — | — | 10 | — | — | — | 0.9 |
| Saccharose (%) | — | — | — | 100 | — | — | 3.5 |
| Ash (%) | <0.1 | 0.51 | 7.7 | — | 0.5 | — | 0.9 |
| Dry matter (%) | <0.1 | 15.5 | 96 | 100 | 43 | 100 | 16.9 |

Example 10

Composing Lactose-Free Whey Protein Containing Milk Drink from Membrane Filtration Fractions of Hydrolyzed Whey and Skim Milk A lactose-free whey protein containing milk drink was composed from the NF retentate of the hydrolyzed whey of Example 7, hydrolyzed skim milk, water and the UF retentate of the hydrolyzed skim milk of Example 2. The compositions of the fractions and the proportions thereof in the admixtures, and the composition of the lactose-free whey protein containing milk drink are shown in Table 14. The lactose-free whey protein containing milk drink contained less carbohydrates and more whey protein, its proportion of the protein of the drink being 50%, than normal milk.

TABLE 14

Composing lactose-free skim whey protein containing milk drink from nanofiltration fractions and from skim milk.

| | NF retentate (whey, Example 7) | Hydrolyzed skim milk | Water | UF retentate (milk, Example 2) | Lactose-free skim whey protein containing milk drink |
|---|---|---|---|---|---|
| Proportion (%) Composition | 27.3 | 40.2 | 27.0 | 5.5 | |
| Protein (%) | 4.59 | 3.39 | 0 | 12.5 | 3.3 |
| Glucose (%) | 1.99 | 2.27 | 0 | 2.17 | 1.6 |
| Galactose (%) | 1.80 | 2.23 | 0 | 2.08 | 1.5 |
| Ash (%) | 1.52 | 0.76 | 0 | 1.50 | 0.8 |
| Dry matter (%) | 10.20 | 8.78 | 0 | 18.4 | 7.3 |

The invention claimed is:

1. A process for the production of a lactose-free or a low-lactose milk product, the process comprising
   a) hydrolyzing the lactose in a milk raw material, thus obtaining a hydrolyzed milk raw material,
   b) ultrafiltrating (UF) the hydrolyzed milk raw material to concentrate proteins into an UF retentate and to obtain an UF permeate containing sugars,
   c) nanofiltrating (NF) the UF permeate to separate sugars into a NF retentate and minerals into a NF permeate,
   d) composing the lactose-free or low-lactose milk product from the ultrafiltration retentate obtained in step b) and the nanofiltration permeate obtained in step c), substantially without the addition of water,
   e) optionally, concentrating the product obtained in step d) into a concentrate or a powder.

2. The process of claim 1, wherein the lactose in the milk raw material is partially hydrolyzed and the residual lactose of the partially hydrolyzed milk raw material is post-hydrolyzed during ultrafiltration and simultaneously, the partially hydrolyzed milk raw material is separated into fractions containing proteins, sugars and minerals.

3. The process of claim 1, wherein the NF permeate is used in step b) and/or c) as diawater of diafiltration.

4. The process of claim 1, wherein the NF permeate is concentrated by nanofiltration to provide a second NF permeate which is concentrated by reverse osmosis (RO) to yield a RO permeate and a mineral concentrate as a RO retentate, said RO permeate and/or RO retentate being introduced to the lactose-free or low-lactose milk product.

5. The process of claim 4, wherein the RO permeate or the NF permeate is used as a liquid in composing the milk product.

6. The process of claim 5, wherein the NF permeate is used as the liquid.

7. The process of claim 1, further comprising evaporating the hydrolyzed milk raw material wherein condensation water is obtained and used as a liquid in composing the milk product.

* * * * *